United States Patent [19]
Robel et al.

[11] Patent Number: 5,939,839
[45] Date of Patent: Aug. 17, 1999

[54] CIRCUIT FOR PROTECTING ELECTRICALLY OPERATED LIGHTING ELEMENTS, ESPECIALLY LEDS, FOR ILLUMINATION OR SIGNALING PURPOSES

[75] Inventors: Wolfgang Robel, Filderstadt-Sielmingen; Achim Weiss, Oberderdingen; Helmut Haf, Schwaikheim; Winfried Hardy Gauch, Magstadt, all of Germany

[73] Assignee: Reitter & Schefenacker GmbH & Co. KG, Esslingen, Germany

[21] Appl. No.: 08/980,550

[22] Filed: Dec. 1, 1997

[30] Foreign Application Priority Data

Jul. 7, 1997 [DE] Germany ............................. 197 28 763

[51] Int. Cl.⁶ ..................................................... H05B 37/00
[52] U.S. Cl. .......................................... 315/289; 315/119
[58] Field of Search ...................................... 362/800, 276, 362/227, 802; 315/289, 291, 32, 46, 47, 71, 76, 119

[56] References Cited

U.S. PATENT DOCUMENTS 4,164,145  8/1979  Aron ........................................... 73/293
5,008,613  4/1991  Steinel et al. ............................ 324/133

Primary Examiner—Don Wong
Assistant Examiner—David H. Vu
Attorney, Agent, or Firm—Robert W. Becker & Associates

[57] ABSTRACT

A circuit for protecting electrically operated lighting elements used for illumination or signaling has at least one PTC resistor connected serially upstream of the lighting element. In another embodiment, the circuit has a self-regulating current supply connected serially upstream of the lighting element. In yet another embodiment, the circuit has a down convertor connected serially upstream of the lighting element.

6 Claims, 3 Drawing Sheets

CIRCUIT FOR PROTECTING ELECTRICALLY OPERATED LIGHTING ELEMENTS, ESPECIALLY LEDS, FOR ILLUMINATION OR SIGNALING PURPOSES

BACKGROUND OF THE INVENTION

The present invention relates to a circuit for protecting electrically operated lighting elements, especially LEDs, for signaling or illumination purposes.

Electrically operated lighting elements, especially in the form of LEDs, are often used in the automobile industry, preferably in the tail light fixture. The LEDs are sensitive semi-conductor lighting elements that can be easily damaged when positive or negative voltage peaks occur. Such voltage peaks may, for example, result when connecting the supply voltage or when the load of an inductive consumer element is shut down. The use of diodes having resistors serially connected downstream thereof for limiting current for suppressing high voltage negative impulses is known. However, such switching devices, in general, do not allow to control the lighting elements. Instead, the current supply depends on the supply voltage. Furthermore, such switching devices are not protected against positive voltage.

It is therefore an object of the present invention to embody the aforementioned circuit such that they are protected against positive over voltages and limit the current supply to the lighting element to a level that prevents damage.

SUMMARY OF THE INVENTION

The circuit for protecting electrically operated lighting elements used for illumination or signaling according to the present invention is characterized by comprising at least one PTC resistor connected serially upstream of the lighting element.

Preferably, the circuit further comprises a Z-diode connected serially downstream of the at least one PTC resistor and connected in parallel to the lighting element.

The circuit may also comprise at least one diode serially connected to the lighting element downstream of the at least one PTC resistor.

Advantageously, the circuit further comprises at least one diode serially connected upstream of the at least the one PTC resistor.

The switching device may also comprise at least one first resistor connected in parallel to the at least one PTC resistor.

The switching device may include at least one second resistor connected serially between the at least one PTC resistor and the lighting element.

Preferably, two such PTC resistors are connected serially and each one of the two PTC resistors has one of the first resistors connected in parallel thereto.

The present invention also relates to a circuit for protecting electrically operated lighting elements used for illumination or signaling characterized by comprising a self-regulating current supply connected serially upstream of the lighting element.

The current supply preferably has zero potential.

The current supply comprises at least one field-effect transistor.

Advantageously, the at least one field-effect transistor is a MOSFET.

The switching device may further comprise a diode connected serially upstream of the current supply.

The current supply may comprise of precision resistor connected serially downstream of the at least one field-effect transistor.

The circuit may also comprise at least one PTC resistor connected serially or in parallel to the precision resistor.

Advantageously, the current supply including the precision resistor and the at least one PTC resistor are parts of an IC component.

The IC component includes a temperature compensation means and/or temperature-dependent characteristic current line and/or an external nominal control operated by a control voltage or a control current.

The present invention also relates to a circuit for protecting electrically operated lighting elements used for illumination or signaling comprising a down convertor connected serially upstream of the lighting element.

The down convertor comprises protective circuits for an automatic shut down when a temperature limit or a load limit is surpassed.

Preferably, the down convertor comprises a protective circuit for reducing the output voltage when a temperature limit is surpassed.

The down convertor may comprise a reference voltage terminal for adjusting the output voltage of the down convertor. The lighting elements are preferably connected in parallel.

In the first inventive circuit, the PTC resistor protects the lighting element from a positive over voltage. When a current flows through the PTC resistor which is greater than the nominal current, the PTC resistor will heat up greatly. This causes its resistance to increase rapidly so that the current is limited. In this manner, the serially connected lighting element arranged downstream is safely protected against current that is too great as well as against positive over voltages.

In the second embodiment of the circuit the current flow is limited to a safe value by a self-regulating current supply so that the lighting element arranged downstream is not at risk. Advantageously, the self-regulating current supply comprises a field-effect transistor in which the height of the current flow depends on the potential between the gate and source of the field-effect transistor. Accordingly, a constant current flows through the lighting element, independent of the level of the supply voltage.

The down convertor of the third embodiment of the circuit prevents damage or destruction of the lighting element at too high loads and/or too high temperature. In such cases, the down convertor is shut off.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiment utilizing FIGS. 1 through 9.

The inventive circuits are designed to protect electrically operated lighting elements in the automobile industry. Such lighting elements are used for signaling or illumination purposes and are preferably LEDs. The circuits have the purpose of protecting the sensitive semi-conductor lighting elements against positive or negative voltage peaks. Furthermore, they limit the supply current, when over voltage and/or too great temperatures are present, onto a level that is safe for the lighting element.

Figure 1:
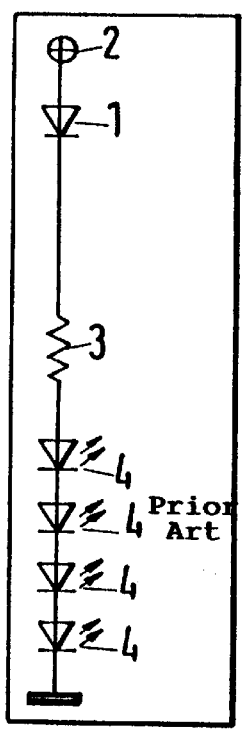
FIG. 1 shows a circuit of the prior art.

FIG. 1 shows a conventional circuit including a diode 1 that is connected to the positive supply terminal 2. The diode 1 suppresses negative high voltage impulses. The supply voltage in the shown embodiment is between 9 and 16 volts. Depending on the application, other voltage values are possible. The diode 1 has connected downstream thereto a resistor 3 with which the current adjustment at the working point can be provided.

Connected in series to the resistor 3, four lighting elements 4 are provided in the shown embodiment which are in the form of LEDs.

The diode 1 protects the lighting elements (LEDs) 4 against negative voltages up to 400 volt, as they occur, for example, when connecting the supply voltage or when voltage peaks during load turnoff of inductive consumers. Due to the pre-resistor 3, a control of the current to the lighting element 4 is not possible. Furthermore, the diode 1 does not protect against positive over voltages.

Figure 2:
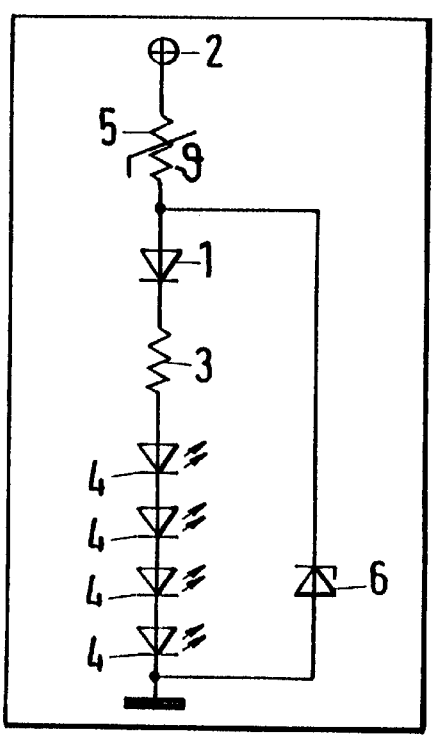
FIGS. 2 through 7 show different designs of the inventive circuit.

The circuit according to FIG. 2 eliminates the aforementioned disadvantages. Between the positive supply terminal 2 and the diode 1, a PTC resistor 5 is provided having a resistance that increases with increasing temperature. A poly switch or multi fuse can be used as the PCT resistor 5. A zener diode (Z-diode) 6 is connected in parallel to the resistor 1 and to the lighting elements 4 in the form of LEDs. The diode 6 together with the PTC resistor 5 protects the lighting element 4 against positive over voltage. When a current that is greater than the specified nominal current flows through the PTC resistor 5, the resistor will heat up to such an extent that the resistance corresponding to the very steep characteristic line will increase quickly. Accordingly, the current is limited so that the lighting element 4 is protected. After cooling of the PTC resistor 5 the circuit operates as before. The PTC resistor 5 can be viewed as an automatic reset fuse. The zener diode 6, which becomes conductive above its specified zener voltage in the non-conducting direction, shortens the response time of the PTC resistor 5 by additional current flow in the case that the operating voltage surpasses the zener voltage. The zener voltage in the shown embodiment is 16 volts.

In a variation of the represented embodiment, the zener diode 6 can also be eliminated. In this case, the high current flows for a short period of time through the lighting element 4 upon current increase, until the PTC resistor 5 responds and its resistance increases so that the current is limited.

Figure 3:
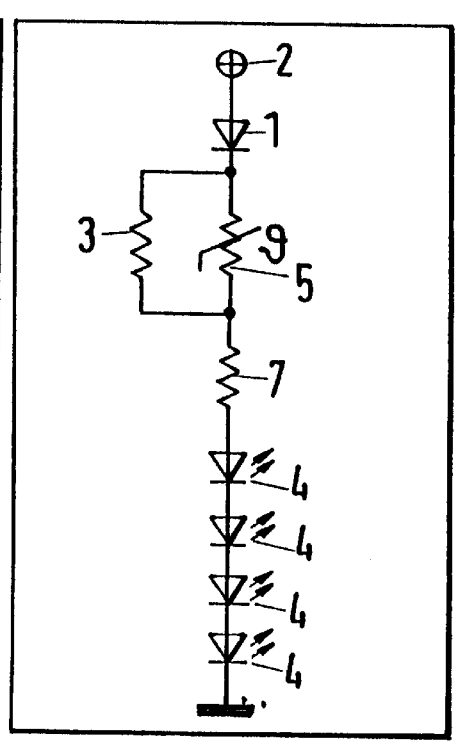

While in the embodiment according to FIG. 2 an over voltage protection is provided, the current according to FIG. 3 is a protective circuit against too great temperatures. The diode is arranged downstream of the positive supply terminal 2. Connected in series is the PTC resistor 5 which itself is serially connected to the resistor 7. It determines the maximum current cold operation conditions in which the PTC resistor 5 has low resistance that is negligible. Parallel to the PTC resistor 5 a current-limiting resistor 3 is arranged that for too great temperatures controls the current to the lighting element 4 (LED) to a safe level.

The sum of the resistors 3 and 7 determines the minimum current in the case of high operating temperatures. The PTC resistor 5 is in this case of high resistance and is negligible, i.e., the current flows substantially only through the resistors 3 and 7 to the lighting element 4. When the operating temperature increases, the working point of this circuit moves to higher currents. The resistance of the PTC resistor 5 increases with increasing temperature and limits the current. The lighting elements 4 are thus operated at the allowable maximum current as a function of the temperature. Between the cold operational state and the hot operational state a continuous or gliding current regulation takes place which, for constant supply voltage, depends on the temperature of the PTC resistor 5.

Figure 4:
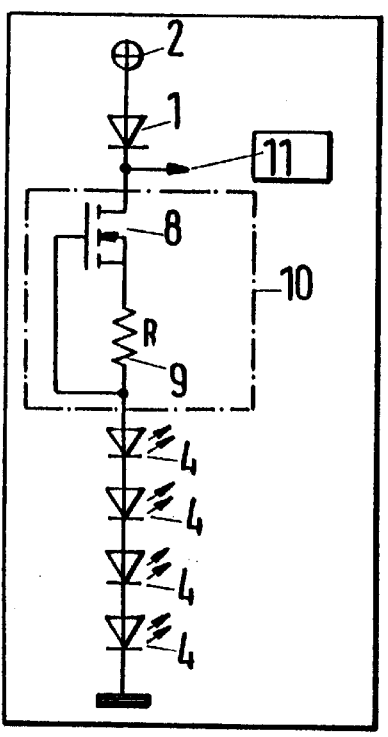

The circuit according to FIG. 4 can be viewed as a self-regulating current supply. The positive supply terminal 2 has connected thereto in series the diode 1. A MOSFET 8 is serially connected to the diode 1 and has connected thereto in series a measuring resistor 9. This measuring resistor 9 measures the nominal current independent of the supply voltage and controls thus the field effect transistor 8 to constant current flow at variable suppliable voltage. The field effect transistor 8 and the measuring resistor 9 provide a simple, self regulating, zero potential MOSFET current supply 10 with the self-conducting depletion-type MOSFET 8. The current flowing through the field effect transistor 8 is dependent on the potential between the gate and the source. Independent of the supply voltage, a constant current flows through the lighting elements 4. Arrow 11 is meant to indicate that this switching device can be cascaded. The other embodiments can also be cascaded.

Figure 5:
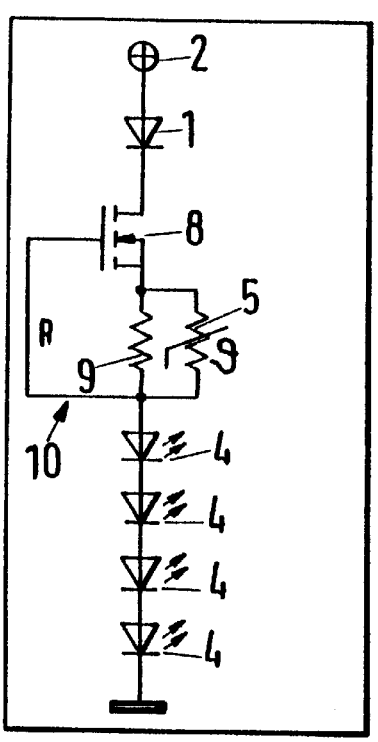

The circuit according to FIG. 5 has the same functions as the switching device according to FIG. 4. In addition to the MOSFET current supply 10, the PTC resistor 5 is switched in parallel or in series to the measuring resistor 9. In other aspects, the switching device according to FIG. 5 is identical to the embodiment of FIG. 4. While in the embodiment according to FIG. 3 the field effect transistor 8 is temperature dependent, i.e., its characteristic line is moved at higher temperatures to higher currents, the PTC resistor in the embodiment according to FIG. 5 ensures that upon movement of the characteristic line of the field effect transistor 8 the current remains at a constant value. The PTC resistor 5 thus ensures a current reduction when a temperature increase occurs. This prevents reliably that the lighting element 4, preferably an LED, can be damaged or destroyed at high temperatures by impermissibly high operating currents.

The PTC resistor 5 can also be used according to the circuit of FIG. 3 to control the current at high temperatures to a lower value.

Figure 6:
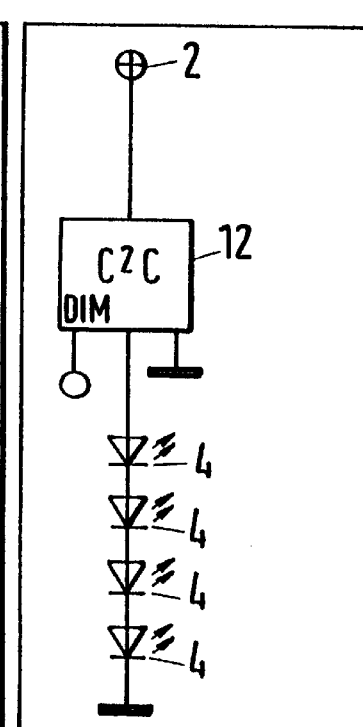

The circuit according to FIG. 6 has the same functions as the circuit according to FIG. 5. However, in addition, this switching device is provided with a temperature compensation (component drifting compensation) and/or a temperature-dependent characteristic current line and/or and external control of the supply current (dimming function) by a control voltage or a control current. All of these possibilities can be integrated into an IC component 12. The switching possibilities according to FIG. 5 can also be included in the IC component 12. It is positioned between the positive supply terminal 2 and the lighting elements 4 (LEDs). The IC component 12 has considerable advantages. For example, an over current resulting from current control is not possible and a defined current limitation for high temperatures is provided. The lighting elements 4 may have a constant luminosity for a wide voltage range, for example, between 9 volt and 16 volt. The IC component 12 can be used for three or four LEDs so that inventory is reduced. When using this component, neither a PTC resistor nor a protective diode or an external resistor are necessary. The lighting elements 4 can be easily dimmed so the lighting elements 4 for driving at night can be controlled such that they have a reduced luminosity compared to the luminosity when driving during the day.

Figure 7:
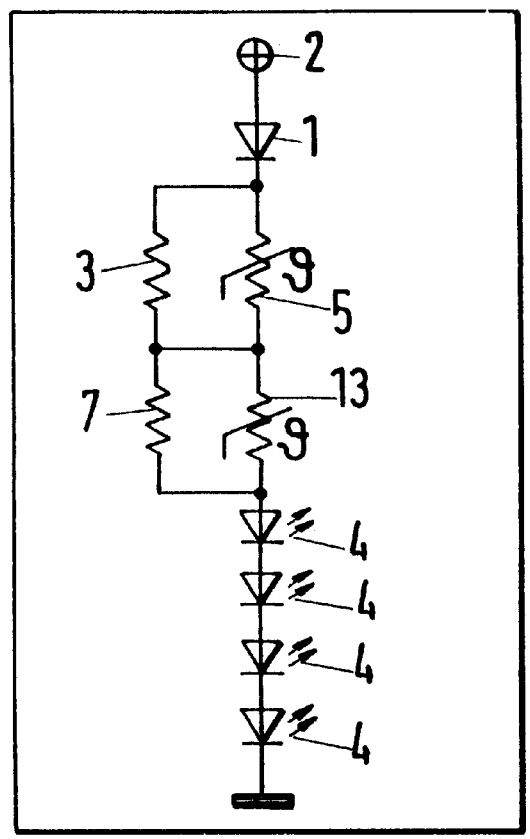

The embodiment according to FIG. 7 is similar to the embodiment according to FIG. 3. A further PTC resistor 13 is connected in series to the PTC resistor 5 and has a resistor 7 connected in parallel thereto. The PTC resistor 13 has a response temperature that differs from the one of the PTC resistor 5. By connecting the further PTC resistor 13 parallel to the resistor 7, this switching device not only has properties of the switching device according to FIG. 3, but also provides an additionally adjusted temperature characteristic line in multiple segments. The PTC resistor 13 and the resistor 7 are serially connected to the PTC resistor 5 and the resistor 3, respectively. Arranged downstream of the PTC resistor 13 are the lighting elements 4 in the form of LEDs.

Figure 8:
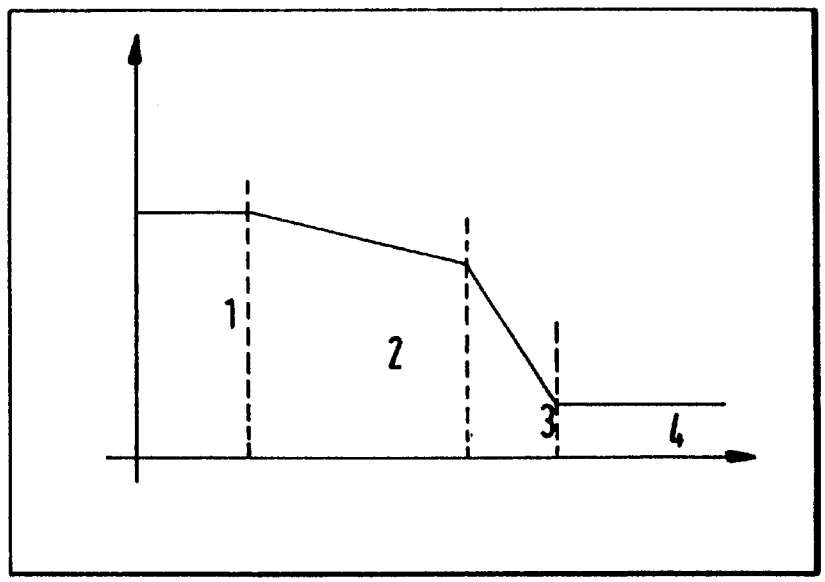
FIG. 8 shows a temperature-current-characteristic line of the circuit according to FIG. 7.

FIG. 8 shows an exemplary manner a temperature-current characteristic line of the switching device according to FIG. 7. The higher the temperature, the lower the current flow. By providing two PTC resistors 5, 13 with different response temperatures, the current can be optimally adjusted to the respective temperature. When too high temperatures occur, the current, as shown in FIG. 8, is reduced to a level that is safe for the lighting elements 4.

Figure 9:
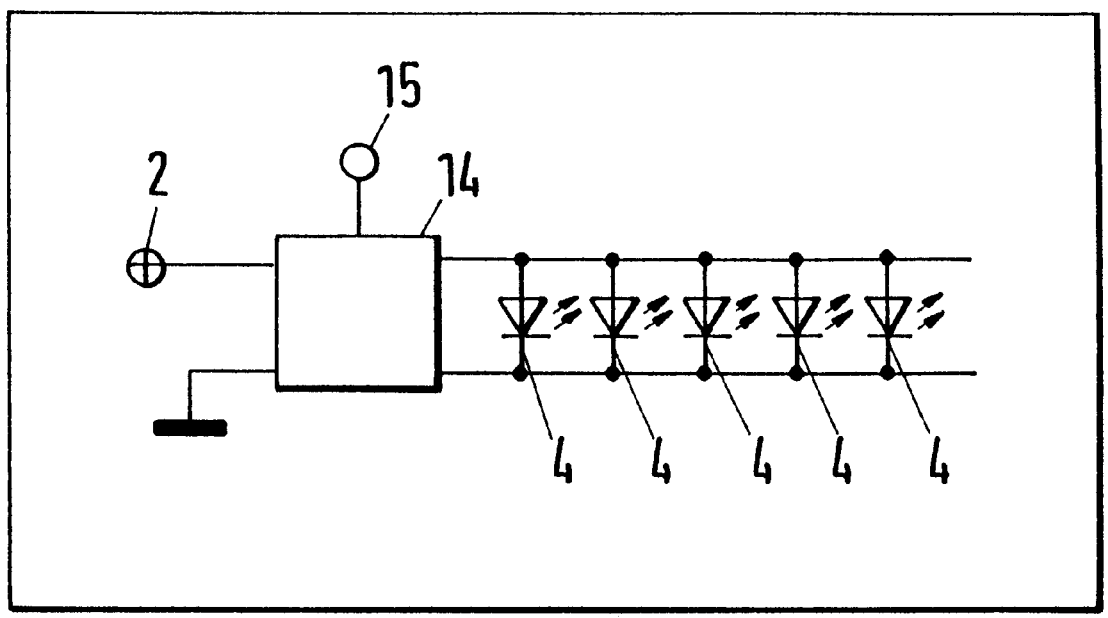
FIG. 9 shows a further design of an inventive circuit.

FIG. 9 shows a circuit in which the input voltage supplied via the positive supply terminal 2 can be reduced by a power supply component 14 according to the principle of a down converter with high efficiency to a control voltage so that the desired amount of current flows through the lighting element 4 (LED). Up to the output limit of the component 14, it is possible to operate any number of LEDs (lighting elements) for in parallel connection. The output voltage of the power supply component 14 can be adjusted by a reference voltage terminal 15 to the specific requirements.

The component 14 has protective circuits for an automatic shut-down when overloads and/or too high temperatures occur and/or for the purpose of reducing the output voltage beyond a certain ambient temperature so that the lighting element 4 is protected. The component 14 is embodied such that it protects the lighting element 4 against positive and negative over voltage impulses.

The specification incorporates by reference the disclosure of German priority document 197 28 763.8 of July 1997.

The present invention is, of course, in no way restricted to the specific disclosure of the specification and drawings, but also encompasses any modifications within the scope of the appended claims.

What is claimed is:

1. A circuit for protecting electrically operated lighting elements used for illumination or signaling, said circuit comprising at least one PTC resistor, connected serially upstream of the lighting elements, and a Z-diode connected serially downstream of said at least one PTC resistor and connected in parallel to the lighting elements.

2. A circuit according to claim 1, further comprising at least one diode serially connected to the lighting elements downstream of said at least one PTC resistor.

3. A circuit according to claim 1, further comprising at least one resistor connected serially between said at least one PTC resistor and the lighting elements.

4. A circuit for protecting electrically operated lighting elements used for illumination or signaling circuit comprising:
   at least one PTC resistor connected serially upstream of the lighting elements;
   at least one diode serially connected upstream of said at least one PTC resistor;
   at least one first resistor connected in parallel to said at least one PTC resistor; and
   wherein two of said at least one PTC resistor are connected serially and wherein each one of said two PTC resistors has one of said at least one first resistor connected in parallel thereto.

5. A circuit for protecting electrically operated lighting elements used for illumination or signaling, said circuit comprising:
   at least one PTC resistor, connected serially upstream of the lighting elements;
   a first resistor connected in series to said PTC resistor;
   a second resistor connected parallel to said PCT resistor;
   a diode connected serially upstream of said at least one PTC resistor.

6. A circuit according to claim 5, wherein said first resistor is positioned between said PTC resistor and the lighting elements.

* * * * *

UNITED STATES PATENT AND TRADEMARK OFFICE
CERTIFICATE OF CORRECTION

PATENT NO : 5,939,839
DATED : August 17, 1999
INVENTOR(S): Wolfgang Robel, Achim Weiss, Helmut Haf,
Winfried Hardy Gauch and Helmut Eberspächer It is certified that error appears in the above-identified patent and that said Letters Patent is hereby corrected as shown below:

Title page, item
[75] Inventors: should read as following:

Wolfgang Robel, Achim Weiss, Helmut Haf,
Winfried Hardy Gauch and Helmut Eberspächer Signed and Sealed this Twenty-fifth Day of January, 2000

Attest:

*Attesting Officer*

*Acting Commissioner of Patents and Trademarks*